United States Patent
Bai et al.

(10) Patent No.: US 9,848,420 B2
(45) Date of Patent: Dec. 19, 2017

(54) METHOD AND APPARATUS OF DYNAMIC WI-FI MULTI-CHANNEL SWITCH BASED ON DATA TRAFFIC CONTEXT

(71) Applicant: GM GLOBAL TECHNOLOGY OPERATIONS LLC, Detroit, MI (US)

(72) Inventors: Fan Bai, Ann Arbor, MI (US); Lakshmi V. Thanayankizil, Rochester Hills, MI (US); David P. Pop, Garden City, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 111 days.

(21) Appl. No.: 15/078,295

(22) Filed: Mar. 23, 2016

(65) Prior Publication Data

US 2016/0295563 A1 Oct. 6, 2016

Related U.S. Application Data

(60) Provisional application No. 62/141,452, filed on Apr. 1, 2015.

(51) Int. Cl.
*H04W 72/04* (2009.01)
*H04W 72/10* (2009.01)

(52) U.S. Cl.
CPC ..... *H04W 72/044* (2013.01); *H04W 72/0486* (2013.01); *H04W 72/10* (2013.01)

(58) Field of Classification Search
CPC ............. H04W 52/367; H04W 72/044; H04W 72/0486; H04W 72/048
See application file for complete search history.

(56) References Cited

U.S. PATENT DOCUMENTS

| | | | | |
|---|---|---|---|---|
| 7,167,715 B2* | 1/2007 | Stanforth | ............. | G01C 21/206 340/539.13 |
| 9,125,062 B2* | 9/2015 | Lin | ........................ | H04W 16/14 |
| 2007/0013419 A1* | 1/2007 | Ayyagari | .............. | H04L 41/044 327/156 |
| 2007/0174809 A1* | 7/2007 | Brown | .............. | H04W 52/0216 717/100 |
| 2008/0316966 A1* | 12/2008 | Joshi | ..................... | H04W 74/02 370/330 |
| 2011/0194644 A1* | 8/2011 | Liu | ........................ | H04L 5/0023 375/295 |
| 2012/0149389 A1* | 6/2012 | Lin | ..................... | H04W 74/002 455/456.1 |
| 2013/0010719 A1* | 1/2013 | Shapira | ............... | H04W 72/082 370/329 |
| 2014/0254549 A1* | 9/2014 | Lee | ........................ | H04W 36/24 370/331 |
| 2015/0305038 A1* | 10/2015 | Du | .................... | H04W 72/0453 370/329 |

(Continued)

*Primary Examiner* — Khaled Kassim
*Assistant Examiner* — Syed S Ali
(74) *Attorney, Agent, or Firm* — Quinn IP Law

(57) ABSTRACT

A dynamic wireless multi-channel switch including a networking device providing access to communicate messages on at least two frequency bands. A wireless access manager module determines a utilization of each frequency band based on the communicated messages. The wireless access manager module dynamically adjusts a time slot ratio of each frequency band as a function of the utilization of the communicated messages by the networking device.

12 Claims, 4 Drawing Sheets

(56) References Cited

U.S. PATENT DOCUMENTS

| | | | |
|---|---|---|---|
| 2016/0100400 A1* | 4/2016 | Lu .................... | H04W 84/12 370/336 |
| 2016/0191121 A1* | 6/2016 | Bell .................. | H04B 5/0037 307/104 |

* cited by examiner

METHOD AND APPARATUS OF DYNAMIC WI-FI MULTI-CHANNEL SWITCH BASED ON DATA TRAFFIC CONTEXT

CROSS-REFERENCE TO RELATED APPLICATIONS

This application claims priority of U.S. Provisional Application Ser. No. 62/141,452 filed Apr. 1, 2015, the disclosure of which is incorporated by reference.

BACKGROUND OF INVENTION

An embodiment relates to dynamic channel resource allocation in wireless communication networking.

Communication networking technology such as Wi-Fi uses radio waves to provide wireless high-speed internet and network connections. Wi-Fi does not utilize any physical wireline connection between a sender and a receiver, but only uses a radio frequency (RF) technology to propagate a radio wave.

In networking locations that utilize a single Wi-Fi chipset to support two different spectrum bands and two model roles, typically a fixed time sharing protocol is utilized for sharing the transmission medium between the two different frequency spectrum bands. That is, each band is assigned a fixed time in which data is communicated over each band. For example, a duty cycle ratio for each communication band may be 50-50 where 50% of the transmission cycle is allocated to the first frequency band and 50% is allocated to the second frequency band. As described, this duty cycle is fixed and if a first frequency band has an excessive amount of data being communicated while a second frequency band has on a minimal amount in comparison to one another, then the non-used portion of the second frequency band is non-efficient use.

SUMMARY OF THE INVENTION

An advantage of the invention is a dynamic allocation of frequency band usage in a communication system where more than one frequency band is utilized. As opposed to equal time slot sharing, a wireless access manager module monitors usage on the respective frequency bands and dynamically applies a time slot ratio of each frequency band based on application priority data and historical statistics. The wireless access manager module continuously and dynamically adjusts the time slots based a usage history for minimizing portions of times slots that are not utilized. The wireless access manager module identifies whether a current utilization of a high-priority frequency band is substantially less or substantially equal to a determined utilization and then applies a respective technique accordingly to determine a new utilization. A low-priority frequency band is determined as a function of the high-priority frequency band.

In addition, the wireless access manager module monitors contention on the each channel and negotiates channel selection of messages transmitted on the frequency bands. The wireless access manager module migrates messages to other channels within the frequency band when contention is identified on the channel. The wireless access manager module selects an orthogonal channel to migrate the message to so that they the migrated messages do not interfere with one another. Contention on the channel is further identified by analyzing message characteristics and message characteristics.

An embodiment contemplates a dynamic wireless multi-channel switch. A networking device provides access to communicate messages on at least two frequency bands. A wireless access manager module determines a utilization of each frequency band based on the communicated messages. The wireless access manager module dynamically adjusts a time slot ratio of each frequency band as a function of the utilization of the communicated messages by the networking device.

An embodiment contemplates a method of adaptively configuring time allocation among frequency bands on a wireless multi-channel transmission networking device. A utilization for each frequency band is determined by a wireless access manager module. A time slot ratio of each frequency band is dynamically adjusted as a function of the utilization of the communicated messages by the networking device.

DETAILED DESCRIPTION

Figure 1:
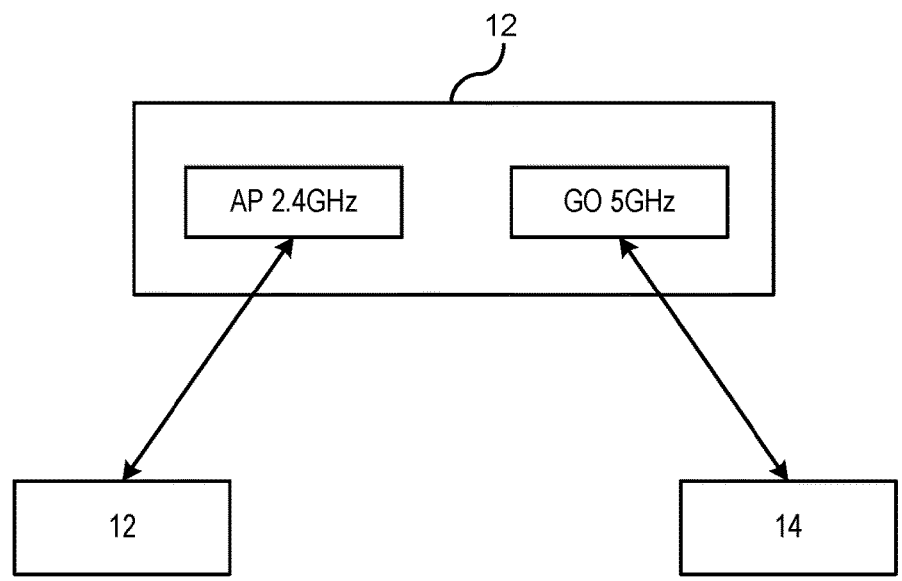
FIG. 1 is an exemplary Wi-Fi configuration for a fixed slot sharing protocol.

FIG. 1 illustrates a current design Wi-Fi configuration that utilizes a fixed slot sharing protocol that can be used between any communicating entities. A head unit 10 is shown for broadcasting and receiving wireless signals in a communication wireless networking system. The head unit includes Wi-Fi networking technology that utilizes two frequency bands, such as 2.4 GHz and 5 GHz. The first frequency band (e.g., 2.4 GHz) may utilize conventional Wi-Fi. The first frequency band may further utilize long term evolution signals (LTE) or other hotspot locations to provide Wi-Fi access for a first wireless device 12 such as a mobile phone.

The head unit 10 may further utilize a second frequency band. A standard such as Wi-Fi direct may be utilized on the second frequency band. Wi-Fi direct, also known as Wi-Fi/P2P, is a standard enabling devices to easily connect with each other without requiring a wireless access points. Wi-Fi Direct has the ability to connect devices even if the respective devices are from different manufacturers as only one of the Wi-Fi devices needs to be compliant with Wi-Fi Direct to establish a peer-to-peer connection. Wi-Fi Direct negotiates the link with a Wi-Fi protected system. As shown in FIG. 1, Wi-Fi direct is used to communicate with a second wireless device 14 to render other types of service such as in-car smartphone projection. Although, the first wireless device 12 and the second wireless device 14 utilize different Wi-Fi standards, the single Wi-Fi chipset within the head unit 10 is used to support the two different spectrum bands (e.g., 2.4 GHz and 5 GHz) for which data is communicated using a time slot sharing protocol.

The time slot sharing protocol dictates the amount of time allocation each frequency band is utilized by the chipset. The slot sharing protocol may include, but is not limited to, time division multiple access (TDMA). TDMA is a channel access method that is used for shared networks. TDMA allows a plurality of users to share a same channel by dividing the signal into different time slots on the channel. Each of the users transmits in their own time slot in a rapid successive order. This allows multiple users to share a same transmission channel utilizing only part of the channel capacity. TDMA is a type of time-division multiplexing, where instead of having a single transmitter connected to a single receiver, there is a plurality of transmitters.

Figure 2:
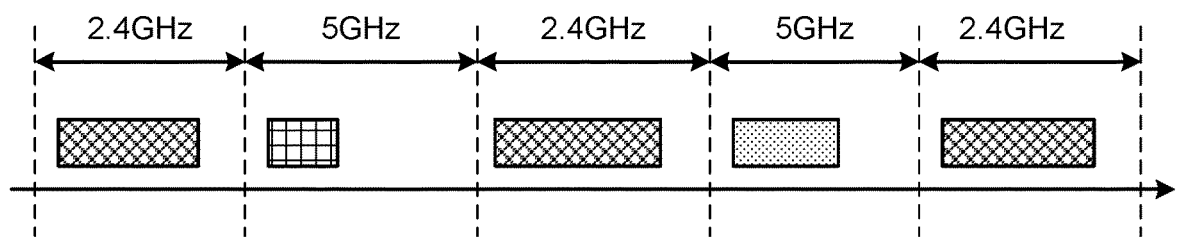
FIG. 2 is an exemplary duty cycle for the fixed slot sharing protocol shown in FIG. 1.

FIG. 2 illustrates the duty cycle associated with the protocol sharing standard shown in FIG. 1. A timeline is shown for time slot sharing by the head unit. The time slot sharing is set to 50-50 where the broadcast slot allocation by the Wi-Fi chipset allows for data to be transmitted on the first frequency band (2.4 GhZ) 50% of the time and data to be transmitted on the second frequency band (5 GHz) the other 50% of the time for a respective duty cycle. As shown in FIG. 2, the respective frequency bands alternate broadcasts is rapid successive order, thereby alternating the frequency bands usage time.

As shown in FIG. 2, a duration of time allocated on the 5 GHz frequency band is not fully utilized by the data packets transmitted or received in respective transmission slots, whereas transmissions on the 2.4 GHz frequency bands may be fully utilized or even have contention on a channel within the 2.4 GHz frequency band due to high traffic data demand. Since the allocated time slots among the 2.4 GHz frequency band and the 5 GHZ frequency band are at a fixed duty cycle, respective time slots may not be efficiently utilized. A similar situation could happen as the 5 GHz frequency band is fully utilized or even has a backlog while the 2.4 GHz frequency band is significantly under-utilized.

Figure 3:
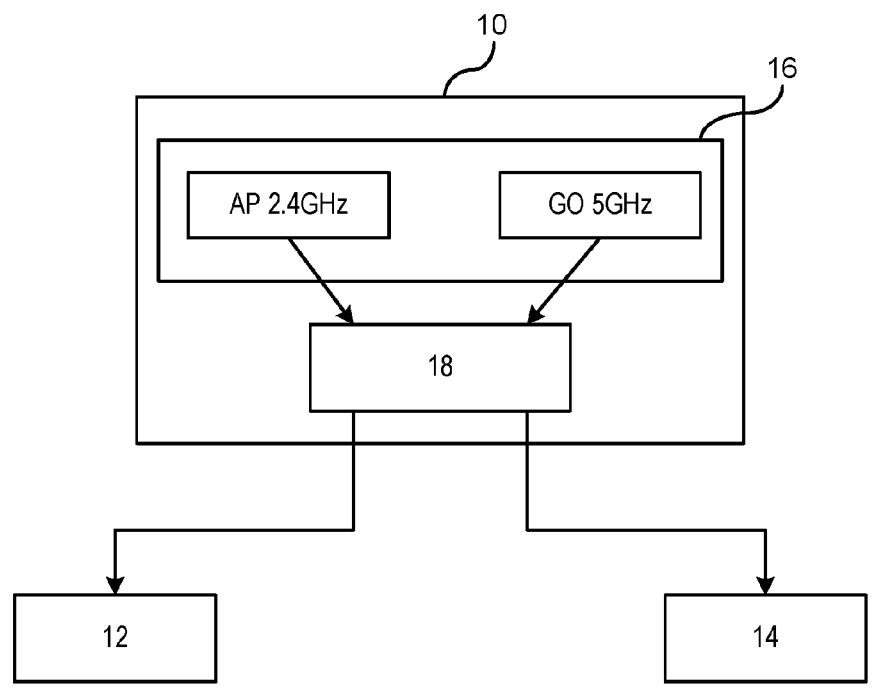
FIG. 3 illustrates a block diagram of a system configuration for dynamically adjusting time slot sharing protocol.

FIG. 3 illustrates a block diagram incorporating a Wi-Fi access manager for dynamically adjusting time slot duration between each of the frequency bands utilized. The head unit 10 includes a Wi-Fi chipset 16 for supporting the various frequency bands. A Wi-Fi access manager 18 determines the utilization for each of the frequency bands and dynamically allocates times slots and the duration of time for the time slots according to the utilization history. Thereafter, the head unit 10 enables each respective transmission band according to the determined slot allocation time as function of the utilization history.

The Wi-Fi access manager 18 overcomes the issue with inefficient use of slot duration. The Wi-Fi access manager 18 dynamically adjusts slot duration for each of the frequency bands. A dynamic slot ratio technique is applied to dynamically adjust slot duration by utilizing application priority and historical statistics of both frequency bands. It should be understood that the frequency bands may be other than the 2.4 GHz and the 5 GHz. In addition, more than two bands may be dynamically allocated within a periodic transmission cycle.

The Wi-Fi access manager 18 observes the spectrum utilization ratio on both frequency bands. During the design stages, one of the respective frequency bands are identified as the high-priority band and the other frequency band is identified as the low-priority band. The Wi-Fi access manager then analyzes utilization on the high-priority band. The following criteria/logic is utilized for determining utilization on the high-priority band:

$$\text{if(utilization} \ll t\_\text{high),then } t\text{-high=max}(t\_\text{high--}, t\_\text{high\_min}) \quad (1)$$

where utilization is a current utilization of high-priority band, t_high is a determined utilization time for the high-priority band, t_high-- is equal to t_high less a first predetermined adjustment value, and t_high_min is a predetermined minimum value.

In regards to the logic set forth in eq. (1), when the system is first initialized, t_high will be assigned an initial value; thereafter, t_high will take on the last determined value. The value for t_high is compared to the actual utilization for determining whether the actual utilization is substantially less than t_high (utilization<<t_high). If the actual utilization is substantially less than t_high, then, t_high is assigned a value of the maximum of either t_high-- or t_high_min. The value for t_high-- is the current t_high value less the first predetermined adjustment value (e.g., t_high−1). It should be understood that the formula shown for t_high-- is exemplary and the first predetermined adjustment value subtracted from t_high may be a value other than 1.

If the utilization is determined to be substantially equal to the current t_high value, then the following logical condition is utilized:

$$\text{if(utilization} \sim= t\_\text{high),then } t\text{-high=min}(t\_\text{high++}, t\_\text{high\_max}) \quad (2)$$

where utilization is the current utilization of the high-priority band, t_high is the determined utilization time for the high priority band, t_high++ is equal to t_high plus a second predetermined adjustment value, and t_high_max is a predetermined maximum value.

In regards to the logic set forth in eq. (2), as described earlier, when the system first initialized, t_high will be assigned an initial value; thereafter, t_high will take on the last determined value. The value for t_high is compared to the actual utilization time for determining whether the actual utilization is substantially equal to the previously determined t_high (utilization~=t_high). If the actual utilization is substantially equal to t_high, then t_high is assigned a value of the minimum of either t_high++ or t_high_max. The value for t_high++ is the current t_high value plus the second predetermined adjustment value (e.g., t_high+1). It should be understood that the formula shown for t_high++ is exemplary and the predetermined value added to t_high may be a value other than 1. Moreover, the first predetermined adjustment value may or may not be equal to the second predetermined adjustment value.

After the duration of time is set for the utilization of the high-priority band, the low-priority band may be determined by subtracting the utilization determined for the high-priority band (t_high) from the duty cycle time allocated for both bands. This is represented by the following:

$$t\_\text{low}=t-t\_\text{high} \quad (3)$$

where t_high is the determined utilization of the high priority band as determined in eq. (1) or (2), and t is the periodic utilization time allocated for a duty cycle of t_low and t_high.

Figure 4:
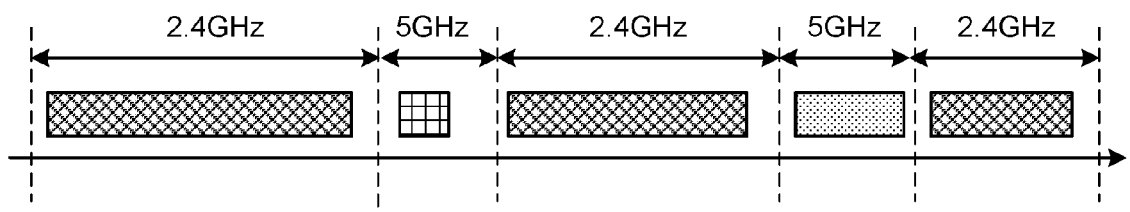
FIG. 4 is an exemplary timeline representing a dynamic time slot allocation utilization.

FIG. 4 represents a timeline of the two frequency bands after dynamic utilization is applied. As shown in FIG. 4, the respective time slots are adjusted to account for utilization within a respective frequency band. Based on continuous monitoring of the frequency bands, the respective frequency bands can be dynamically adjusted according to their utilization as determined by the Wi-Fi access manager.

In addition to determining a dynamic slot duration for both frequency bands, the Wi-Fi access manager dynamically negotiates channel selection for messages transmitted on the frequency bands and then migrates the messages to other channels within a respective frequency band when contention is identified on a current channel of the respective frequency band.

The Wi-Fi access manager observes each channel of the frequency bands and the time use statistics and channel conditions on these channels in respective frequency band, using Wi-Fi beaconing mechanism. The Wi-Fi access manager will either intentionally select a random channel or intelligently select the least used channel within a respective frequency band and assign a data traffic flow to the selected channel being monitored of the respective frequency band. If contention is determined on the selected channel of the respective frequency band, then another channel within the respective frequency band is identified. Contention is a term where data packet collisions occur on a same channel due to two or more data packets attempting to transmit over the same channel at the same time. The Wi-Fi access manager selects another channel within the frequency band that is orthogonal to the current channel having the contention. Orthogonality is typically interpreted as set of frequency multiplexed signals with the minimum frequency spacing needed to make the signal orthogonal so that they do not interfere with each other. An orthogonal channel is defined herein as a first channel relative to a second channel in the same frequency band where the first channel is not neighboring the second channel, which could otherwise result in sideband interference occurring between the first and second channel. As a result, a respective channel within the same frequency band is selected that is orthogonal to the respective channel associated with the contention.

Figure 5:
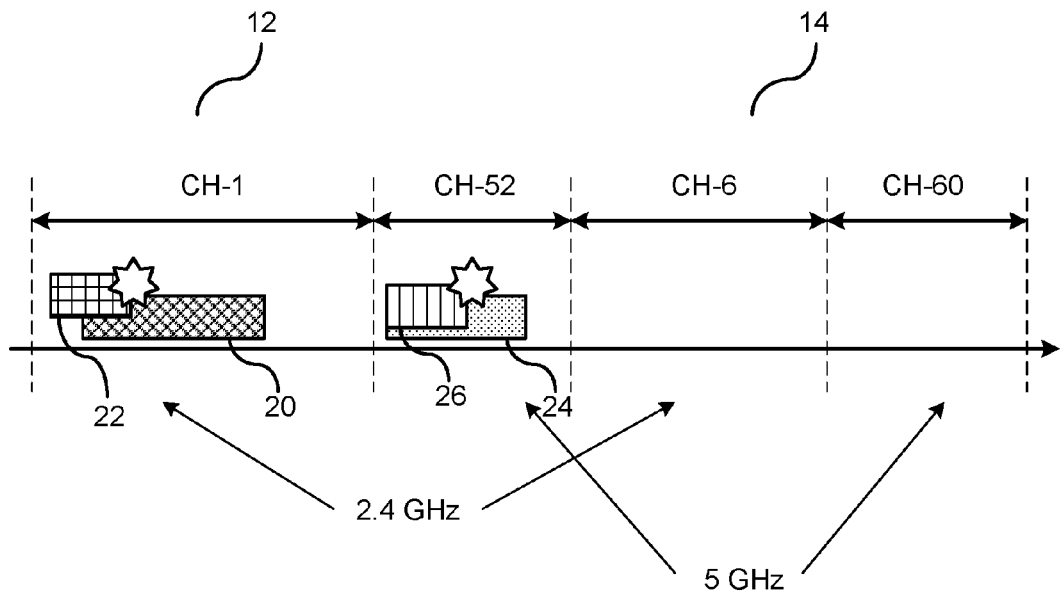
FIG. 5 is a timeline illustrating contention occurring in both frequency bands.
Figure 6:
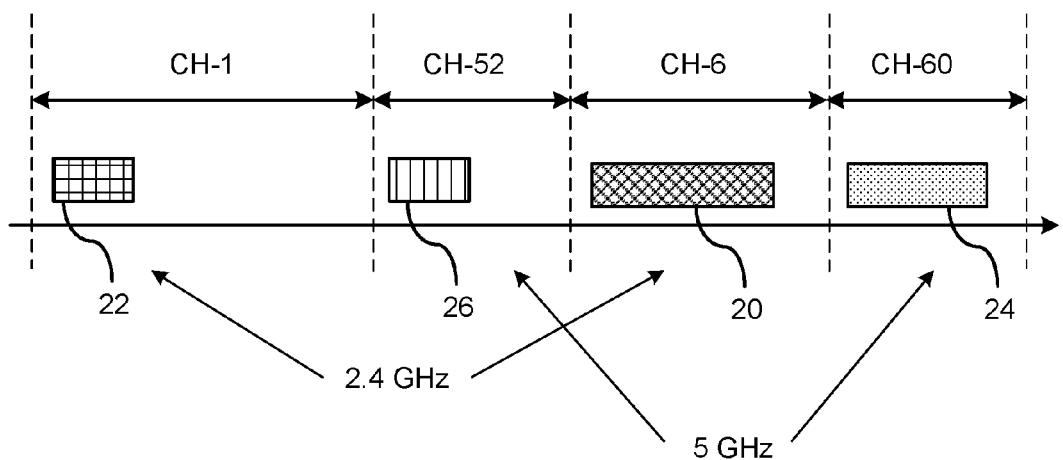
FIG. 6 is a timeline illustrating reallocation of a message to another channel.

FIG. 5 illustrates a graph where contention occurs in both frequency bands. A first data flow 20 is transmitted on channel 1 in the 2.4 GHz band and it is determined that contention is present with respect to a second data flow 22 also transmitted on the channel 1. As shown in FIG. 6, to correct the contention issue, the Wi-Fi access manager migrates the first data flow 20 to channel 6, which is orthogonal to channel 1 such that no sideband interference will occur between the respective channels.

Similarly, as shown in FIG. 5, a third data flow 24 is transmitted on channel 52 in the 5 Ghz band and it is determined that contention is present with respect to a fourth data flow 26 also transmitted on the channel 52. To correct the contention issue, as shown in FIG. 6, the Wi-Fi access manager migrates the third data flow 24 to channel 60 which has been determined to be orthogonal to channel 52 such that no sideband interference will occur between the respective channels.

Figure 7:
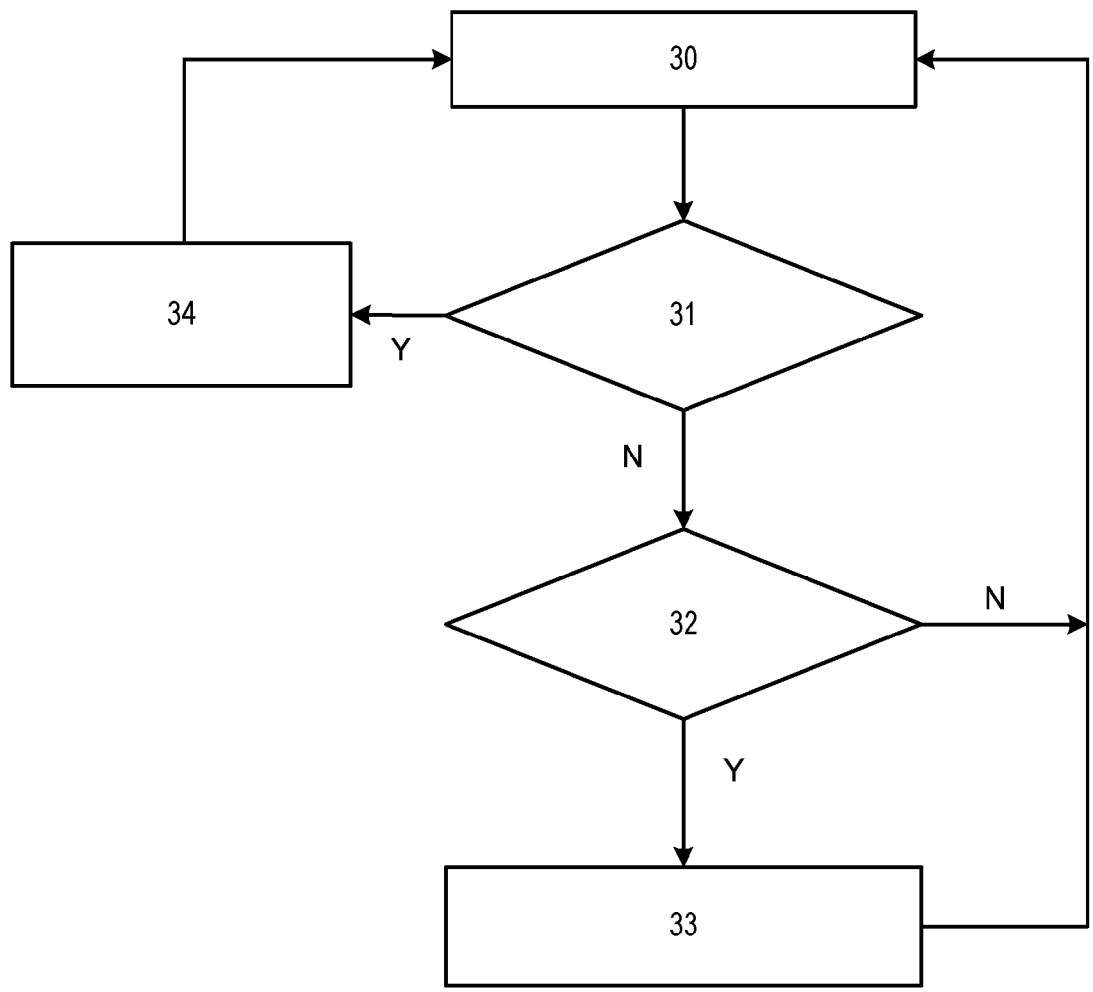
FIG. 7 is a method of a flowchart for monitoring a channel contention over a plurality of channels.

FIG. 7 illustrates a flowchart for monitoring a channel to determine channel characteristics on a respective frequency band for determining a congestion level by the Wi-Fi access manager.

In block 30, a respective channel is identified and a timer is initiated.

In block 31, a determination is made as whether the timer has expired. If the timer is not expired, then the routine proceeds to step 32. If the timer is expired, then the routine proceeds to step 34.

In response to the determination that the timer is not expired, the routine proceeds to step 32. In step 32, a determination is made whether there is an outgoing or incoming message in the data flow. If the determination is made that there is no outgoing or incoming message in the data flow, then a return is made to step 31 to determine whether the timer is expired. If the determination is made that an incoming or outgoing message is detected, then the routine proceeds to step 33.

In step 33, characteristics of the message are determined. Message characteristics include, but are not limited to, a timestamp of when the message is recorded, and the access time on the channel. After determining the message characteristics, a return is made to step 31 to determine whether the timer is expired. The routine will monitor the channel for any additional messages until the timer is expired. Once the timer is expired, then the routine proceeds to step 34.

In step 34, in response to the timer expiring, channel characteristics are determined which are used in determining the level of congestion or content on the channel. Channel characteristics include, but are not limited to, channel utilization, latency, packet delivery ratio (PDR), and throughput. Channel utilization identifies the amount of time that the channel is being utilized over a respective duration of time. Latency represents a response or delay caused by contention over the channel (e.g., channel selection may be based on a channel with a low latency). Packet delivery ratio (PDR) is a measure of the success of communicating a packet of data from one entity to another entity. Throughput is an average measure of the speed of broadcasting data packets in the monitored channel. It should be understood that any combination of the respective channel characteristics may be utilized for selecting the channel. Moreover, each of the channel characteristics may be weighted so that those characteristics that are determined to be more reliable in assessing contention on the channel are given a greater weight. After channel contention is determined for the channel, a return is made to step 30 to switch to a next channel for determining a level of channel contention on the next channel.

The routine thereafter continuously and repetitiously monitors each of the channels within the frequency bands for monitoring communication activity and contention on the channels.

While certain embodiments of the present invention have been described in detail, those familiar with the art to which this invention relates will recognize various alternative designs and embodiments for practicing the invention as defined by the following claims.

What is claimed is:

1. A dynamic wireless multi-channel switch comprising: a networking device including a processor and memory, the network device providing access to communicate messages on at least two frequency bands; a wireless access manager module determining a utilization of each frequency band based on the communicated messages, the wireless access manager module dynamically adjusting a time slot ratio of each frequency band as a function of the utilization of the communicated messages by the networking device:

wherein the wireless access manager module applies a dynamic slot ratio technique by utilizing application priority and historical statistics of the at least two frequency bands;

wherein one of the at least two frequency bands is identified as a high-priority frequency band and the other of the at least two frequency bands is identified as a low-priority frequency band;

wherein the wireless access manager module determines the utilization of the high-priority band when the utilization is substantially less than the determined utilization value, wherein the utilization is set as follows:

when (utilization<<t_high), then t-high=max(t_high--, t_high_min) where utilization is a current utilization of high-priority band, t_high is a determined utilization time for the high-priority band, t_high-- is equal to t_high less a first predetermined adjustment value, and t_high_min is a predetermined minimum value;

wherein the wireless access manager module determines the utilization of the high-priority band when the utilization is substantially equal to the determined utilization value of the high priority band, wherein the utilization is set as follows:

when (utilization.about.=t_high), then t-high=min(t_high++, t_high_max) where utilization is the current utilization of the high-priority band, t_high is the determined utilization time for the high priority band, t_high++ is equal to t_high plus a second predetermined adjustment value, and t_high_max is a predetermined maximum value; and wherein the wireless access manager module determines the utilization of the low-priority band when the utilization based on the following equation: t_low=t-t_high where t_high is the determined utilization of the high priority band, and t is the periodic utilization time allocated for a duty cycle of t_low and t_high.

2. The dynamic wireless multi-channel switch of claim 1 further comprising a first wireless device communicating on a first frequency band and a second wireless device communicating on a second frequency band.

3. The dynamic wireless multi-channel switch of claim 1 wherein the network device includes a wireless chipset supporting a plurality of frequency bands.

4. The dynamic wireless multi-channel switch of claim 1 wherein the utilization of the high priority band is determined to be either substantially less than a determined utilization value or substantially equal to the determined utilization value.

5. The dynamic wireless multi-channel switch of claim 1 wherein t_high is initially assigned a predetermined value for a first assessment of whether the utilization is substantially less than or equal to t_high for the high-priority band.

6. The dynamic wireless multi-channel switch of claim 1 wherein each respective frequency band includes a plurality of channels, wherein the wireless access manager module dynamically negotiates channel selection for messages transmitted on the frequency bands, the wireless access manager module migrating the message to other channels within a respective frequency band when contention is identified by the wireless access manager module on a current channel of the respective frequency band.

7. The dynamic wireless multi-channel switch of claim 6 wherein the wireless access manager module selects another channel within the frequency band that is orthogonal to the current channel having contention.

8. The dynamic wireless multi-channel switch of claim 7 wherein the wireless access manager module determines a congestion level as a function of message characteristics.

9. The dynamic wireless multi-channel switch of claim 8 wherein the message characteristics include a timestamp of when a message is recorded.

10. The dynamic wireless multi-channel switch of claim 9 wherein the message characteristics include an access time on the channel for a message.

11. The dynamic wireless multi-channel switch of claim 7 wherein the wireless access manager module determines a congestion level as a function of channel characteristics that include channel utilization, latency, and packet delivery ratio.

12. The dynamic wireless multi-channel switch of claim 11 wherein the wireless access manager module applies a weight to each of the channel characteristics to determination congestion on the respective channel.

* * * * *